June 26, 1923. Re. 15,639

J. V. ROBINSON

AUTOMATIC TRAIN PIPE CONNECTOR

Original Filed April 7, 1914

Inventor

J. V. Robinson,

By Watson, Cole, Morse & Grindle,

Attorneys.

Reissued June 26, 1923. Re. 15,639

UNITED STATES PATENT OFFICE.

JOSEPH V. ROBINSON, OF NEW YORK, N. Y.

AUTOMATIC TRAIN-PIPE CONNECTOR.

Original application filed April 7, 1914, Serial No. 830,234. Renewed August 3, 1917, Serial No. 184,358. Original No. 1,300,652, dated April 15, 1919. Application for reissue filed May 14, 1920. Serial No. 381,491.

*To all whom it may concern:*

Be it known that I, JOSEPH V. ROBINSON, a citizen of the United States, and resident of New York city, New York County, New York State, have invented certain new and useful Improvements in Automatic Train-Pipe Connectors, of which the following is a specification.

This invention relates to automatic train pipe connectors and has for its object the provision of a connector designed and constructed to permit the removal of a defective gasket from the face of the connector head when the car to which the connector is fastened is coupled to another car and the connector head mated with a second connector head without necessitating the uncoupling of the cars or the separation of the coupling heads.

Figure 1:
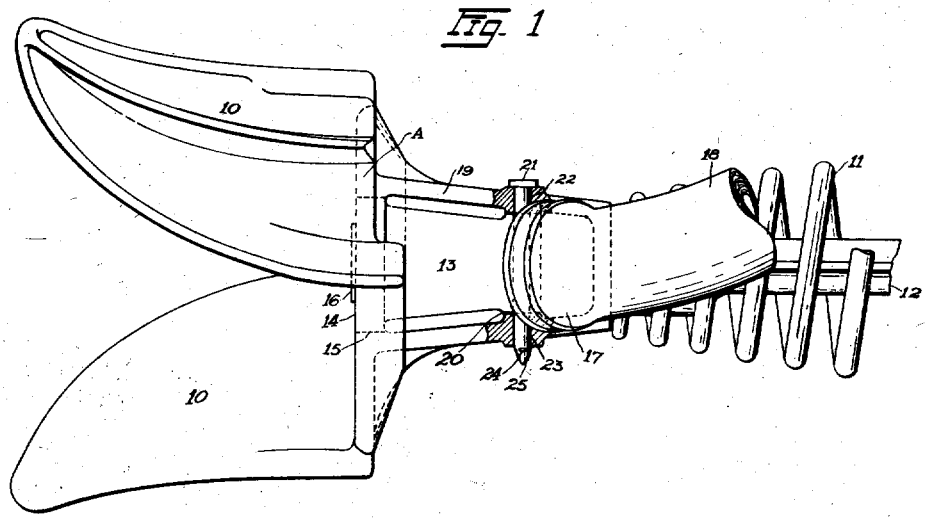
Figure 2:
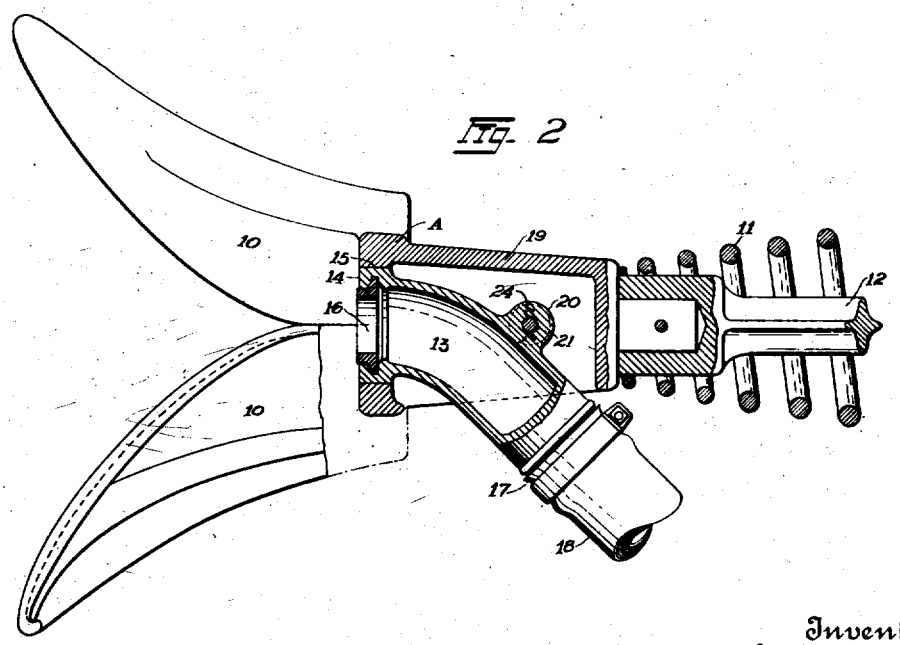

The invention will be fully disclosed in the following description when taken in connection with the accompanying drawings, in which:

Figure 1 is a side elevation of my improved connector, part being broken away; and Figure 2 is a horizontal longitudinal sectional view thereof.

A coupling head A is provided with guiding prongs 10 for aligning the mating heads in coupling and may be supported in any well known manner which allows the head freedom of movement for coupling purposes and in which the mating heads are tightly pressed together when in coupled position. A satisfactory form of support is illustrated and described in my Patent No. 1,245,795, dated November 6, 1917, and, in the drawing of the present application, the numerals 11 and 12 indicate the spring and stem respectively of such a support.

The head A is provided with an aperture 15 which receives with a close fit the enlarged forward end 14 of a rearwardly extending laterally diverging hollow curved conduit 18, for directing a fluid to the head. At its enlarged end the conduit carries a gasket 16 of any suitable shape and of any desired material, but preferably of rubber, the face of the gasket projecting slightly in advance of the face of the connector head and the enlarged end of the conduit terminating substantially flush with the front or coupling face of the head. The rear end of the fitting B is connected at 17 to the hose or flexible pipe 18 of the car. The fitting lies within a hollow shank 19 suitably connected to the head A and is provided with a perforated boss 20 for receiving a pin 21. The faces of the boss 20 fit closely against the inner walls of the hollow shank 19 so that there is no rattling of the parts due to their relative movement in service, resulting in wear and inaccuracy. The pin 21 is passed through a hole 22 in the upper wall of the hollow shank 19 down through the boss 21 on the fitting and through a hole 23 in the lower wall of the shank 19, the pin being locked in position therein by a cotter pin 24, as shown. In this manner the fitting 13 is firmly held in the service position.

To remove the fitting from the head A and renew a defective gasket without uncoupling the cars or separating the coupled connector heads, the pin 21 is extracted and the fitting shifted rearwardly in the shank 19 until its enlarged end 14 is disengaged from the aperture 15 of the connector head, whereupon it may be readily withdrawn from the shank, the gasket 16 removed and a new gasket inserted.

The extremity of the pin 21 is tapered as at 25 and the pin acts as a wedge as it is driven into position forcing the fitting 13 forward in the shank 19 and aperture 15 and compressing the new gasket by forcing it against the corresponding gasket of the mating head.

I have illustrated and described one form of the invention but it will be obvious that numerous changes in the design and arrangement of parts may be made.

Having thus described the invention what is claimed as new and desired to be secured by Letters Patent is:

1. In an automatic train pipe connector, the combination of a coupling head provided with a face and having an aperture therein, a suitable support for said head including a hollow shank extending rearwardly from the head, a conduit in said shank and aperture for directing a fluid to the head, said conduit being curved laterally of the head out of said shank, a flexible pipe connected to said conduit, and means for maintaining the conduit in said shank and aperture and for permitting removal therefrom while said head is coupled up in service.

2. In an automatic train pipe connector, the combination of a connector head having an aperture through its face and an opening through a side wall, a conduit extending through said opening and into said aperture and having a boss thereon, a gasket supported in said aperture by said conduit, and a device engaging said boss on the conduit and extending through a side of that portion of said head into which the conduit extends.

3. In an automatic train pipe connector, the combination of a connector head having an aperture through its face and having also a shank, a conduit one end of which extends into said aperture and supports a gasket, and a pin extending through alined apertures formed in said shank and said conduit, the pin serving to hold the conduit in position and to exert a wedging action on the conduit to compress said gasket when replacing said conduit in the aperture after extraction therefrom.

4. In an automatic train pipe connector, a coupling head having a coupling face, a tube, a shank extending rearwardly from said head past said tube, said tube being removably arranged in said shank and terminating at its front end adjacent the coupling face of the head, a gasket supported by the front end of said tube, said tube being curved laterally of the head, and means for maintaining said tube and gasket in said shank and for permitting removal thereof from the shank while said coupling head is coupled up in service.

5. In an automatic train pipe connector, the combination of a coupling head provided with an opening, a gasket resting normally within said opening, a shank extending rearwardly from the head and serving to support the head, a tube in said shank for directing a fluid to the head and gasket, said tube being curved laterally of the head and having at its forward end a seat against which the rear face of said gasket rests, and a removable device supported by said shank and extending transversely thereof for maintaining said tube in said shank and for permitting removal of the tube from the shank while said head is coupled up in service, said device having a part shaped to form said tube forwardly in said shank.

6. In an automatic train pipe connector, the combination of a coupling head having an aperture, a support for said head, a conduit having one end extending into said aperture for directing a fluid to said head and having its other end mounted in and non-threadingly connected to a train pipe hose, a gasket mounted on the first mentioned end of the conduit, a shank extending from the rear side of said head rearwardly towards said support and past said conduit, and means for detachably securing the conduit to said shank, whereby said conduit and said gasket may be removed from said aperture while said head is coupled up in service and without first disconnecting said train pipe from said conduit.

7. In an automatic train pipe connector, the combination of a coupling head provided with an aperture, a suitable support for said head including a shank extending rearwardly of said aperture on an axis coincident to the longitudinal axis of the aperture, a conduit mounted in said shank and aperture and removable therefrom while said head is coupled to a mating head, a seat in said shank for said conduit, and means for removably securing said conduit on said seat and in said aperture and said shank, said means comprising a device arranged on one side of said conduit and extending transversely thereof and engaging the conduit and an adjacent wall of said shank.

8. In an automatic train pipe connector, the combination of a coupling head provided with an aperture and having a suitable support including a shank extending rearwardly of said aperture, a conduit mounted in said aperture and supporting a gasket therein, said conduit and gasket being removable rearwardly therefrom while said head is coupled to a mating head, a boss on said conduit having an opening therein, and a device extending through the opening in said boss transversely of the longitudinal axis of said conduit and engaging a wall of said shank whereby said conduit is held in said aperture, and means for maintaining said device in the service position in said shank.

9. In an automatic train pipe connector, the combination of a coupling head having a coupling face and also having an aperture, said head being provided with a rearwardly extending hollow portion or shank adjacent said aperture, said rearwardly extending portion or shank of the head having a seat adapted to receive a spring, a conduit mounted in said aperture and hollow portion or shank of the head and removable therefrom while said head is coupled to a mating head, means for securing said conduit in position, a gasket arranged within said aperture and adjacent the front end of said conduit with its face projecting beyond the coupling face of the head, and a spring resting on said seat and serving to support said head and place said gasket under pressure when said head is coupled to a mating head.

10. In an automatic train pipe connector, the combination of a coupling head having a coupling face and also having an aperture extending therethrough, a hollow shank secured to said head and extending rearwardly of the same in line with said aperture, said shank having a seat for receiving a spring, a conduit arranged in said aperture and extending into said shank and removable therefrom when said head is coupled to a mating head, means for securing the conduit in position, a gasket associated with the front end of said conduit and normally projecting beyond the coupling face of the head, and a spring mounted on said seat and serving to place said gasket under pressure when said head is coupled to a mating head.

11. In an automatic train pipe connector, the combination of a coupling head having an aperture, a conduit for directing a fluid to said head, said conduit having one end extending into said aperture and terminating substantially flush with the coupling face of the head and having at said end a seat to receive a gasket, the other end of said conduit being directly connected to a flexible train pipe, a gasket mounted in said seat, and non-screw means for removably holding said conduit in position in said aperture and for permitting its removal therefrom while said head is coupled up in service.

12. In an automatic train pipe connector, the combination of a coupling head having a coupling face and an aperture therein, a hollow fluid tight laterally diverging conduit one end of which extends through said aperture and substantially flush with the coupling face of said head and the other end of which is secured to a flexible train pipe hose, a gasket in that end of said conduit which extends through said aperture, said gasket being adapted to abut with a complementary gasket in a counterpart head, and non-screw means for maintaining said conduit in position in said aperture with said gasket in said abutting relation and for permitting removal and replacement of the conduit and gasket with respect to said aperture while said head is coupled up in service, said means being movable transversely of the conduit.

13. In an automatic train pipe connector, the combination of a coupling head having a face and an aperture therein, spaced walls extending rearwardly from the head and provided each with an opening, a fluid conduit having its rear end provided with means for receiving a train pipe and having its front end positioned in said aperture and between said spaced walls, a gasket seat cut in the front end of said conduit, a gasket in said seat, said conduit and gasket being removable from said aperture while said coupling head is coupled up in service, and manually operated non-screw means in the openings in said spaced walls to lock said conduit in said aperture with said gasket disposed in substantially the plane of the coupling face of said head.

14. In an automatic train pipe connector, the combination of a coupling head having an aperture, said head being provided adjacent said aperture with rearwardly extending spaced walls forming a shank which shank is provided on its rear side with a seat adapted to receive a compression spring, a conduit positioned between said spaced walls and having a portion which extends into said aperture, said conduit being adapted to be moved longitudinally in the aperture, means for securing the conduit in position, a gasket mounted in the front end of the conduit with its front face projecting beyond the coupling face of the head, and a spring resting on said seat and serving to support said head, and place said gasket under pressure when said head is coupled with a mating head.

Signed at New York, N. Y., this 5th day of May, 1920.

JOSEPH V. ROBINSON.